United States Patent [19]

Morishita et al.

[11] Patent Number: 4,900,701

[45] Date of Patent: Feb. 13, 1990

[54] ZIRCONIA SINTERED BODY AND PROCESS FOR THE PRODUCTION THEREOF

[75] Inventors: Junichi Morishita; Nobuo Kimura; Hiromichi Okamura, all of Odawara, Japan

[73] Assignee: Nippon Soda Co., Ltd., Tokyo, Japan

[21] Appl. No.: 155,862

[22] Filed: Feb. 16, 1988

Related U.S. Application Data

[63] Continuation-in-part of Ser. No. 939,165, filed as PCT JP85/00372 on Jul. 3, 1985, published as WO86/05174 on Sep. 12, 1986, abandoned.

[30] Foreign Application Priority Data

| Mar. 7, 1985 [JP] | Japan | 60-43686 |
| Mar. 7, 1985 [JP] | Japan | 60-43687 |
| Mar. 7, 1985 [JP] | Japan | 60-43688 |

[51] Int. Cl.⁴ ............................................. C04B 35/48
[52] U.S. Cl. ................................... 501/102; 501/105; 501/153
[58] Field of Search ..................... 501/105, 102, 153

[56] References Cited

U.S. PATENT DOCUMENTS

| 3,916,585 | 11/1975 | Barks | 501/105 |
| 4,537,865 | 8/1985 | Okabe et al. | 501/135 |
| 4,543,341 | 9/1985 | Barringer et al. | 501/105 |
| 4,626,518 | 12/1986 | Watanabe et al. | 501/104 |

FOREIGN PATENT DOCUMENTS

| 58-9878 | 1/1983 | Japan . |
| 58-156578 | 9/1983 | Japan . |
| 59-174574 | 10/1984 | Japan . |

OTHER PUBLICATIONS

Lange, F., "Transformation Toughening", J. Material Science 17 (1982) pp. 240-246.

*Primary Examiner*—Brian E. Hearn
*Assistant Examiner*—Andrew Griffis
*Attorney, Agent, or Firm*—George B. Oujevolk

[57] ABSTRACT

A process for the production of a raw material used for the production of a zirconia sintered body is disclosed. A power containing principally zirconium compounds and a stabilizing agent is added to a solution or slurry containing at least one metal element selected from the group consisting of Mn, Fe, Co, Ni, Cu, and Zn. The stabilizing agent is $Y_2O_3$, CaO, MgO, $CeO_2$, a yttrium compound, calcium compound, magnesium compound or cerium compound which can produce $Y_2O_3$, CaO, MgO, or $CeO_2$ by thermal decomposition. The selected metal element from the group will act as a coating on the zirconia sintered body.

7 Claims, No Drawings

ZIRCONIA SINTERED BODY AND PROCESS FOR THE PRODUCTION THEREOF

This application is a continuation-in-part of U.S. patent application Ser. No. 06/939,165 filed as PCT JP85/00372 on Jul. 3, 1985, published as WO86/05174 on Sep. 12, 1986, now abandoned.

The present invention relates to a zirconia sintered body including partially-stabilized zirconia and partially-stabilized zirconia containing alumina.

More particularly, the invention relates to a process for the production of a sinterable raw material powder to be used for the production of a zirconia sintered body as well as a method of production of a high density zirconia sintered body, which comprises molding the raw particulate material into a certain shape, and, then burning to sinter. The invention also relates to a $Y_2O_3$ partially stabilized zirconia sintered body of novel composition as well as an alumina-containing a partially stabilized zirconia sintered body.

BRIEF DESCRIPTION OF THE PRIOR ART

A zirconia sintered body is known, as well as a partially stabilized zirconia sintered body wherein a crystal phase of $ZrO_2$ constituting the sintered body is in the tetragonal phase.

As a method for stabilizing the crystal phase of $ZrO_2$ constituting the sintered body, there has been widely used a process which comprising adding a stabilizer such as CaO, MgO, $Y_2O_3$, and/or $CeO_2$ to the raw material powder or the sintered body in order to partially stabilize the crystal phase of $ZrO_2$ in the sintered body.

Particularly, $Y_2O_3$ is widely utilized as a stabilizing agent for the production of a partially stabilized zirconia sintered body having high strength because a sintered body having excellent stability and good mechanical properties is obtained.

The partially stabilized zirconia sintered body has been called a phase transformation toughening type zirconia, wherein it is considered that if an external mechanical stress is applied to the sintered body, the tetragonal phase of $ZrO_2$ constituting the sintered body will transform martensite-like phase into a monoclinic phase, that is a stable phase at the lower temperature range, consequently, the sintered body may have high tenacity because the fracture energy is absorbed by said phase transformation.

Accordingly, it is known that the partially stabilized zirconia sintered body is a functional sintered body having high strength and high tenacity, and it is expected to be used for structural material such as mechanical material, abrasion resistant material and cutting material and etc.

It is necessary to produce the dense sintered body having high density and controlled microstructure by suppressing the grain growth in the sintered body in order to have the desired functions, for example, mechanical properties such as bending strength, tenacity and the like.

There has been produced a dense zirconia sintered body having a controlled microstructure by a special molding technique, and a high pressure sintering technique such as hot press technique or HIP method. However, these methods use complicated operations and special installations, and therefore, the resultant product will be expensive.

On the other hand, there has been proposed a process for the production of a sintered body which comprises preparing the raw material powder by using a chemical technique such as co-precipitation or the like, and then, sintering the raw material powder so obtained in a mold at a comparatively low temperature.

Also, it is known that in general, the more finely divided particulate material has the stronger cohesive force. Therefore, it is difficult to produce a sintered body having high density with high reproducibility from chemically-treated raw powder.

Further, there has been proposed the addition of a sintering activator, for example, Japanese Laid Open Gazette No. 50-10351 describes a process for producing a sintered body comprising molding and sintering a raw material powder which is obtained by adding aqueous ammonium to the mixed aqueous solution containing water soluble zirconium salt, water soluble salts of calcium, magnesium, yttrium and the like as a stabilizing agent(s), and water soluble salt of another transition metal for a sintering activator, so as to precipitate the desired co-precipitated hydroxide-containing the desired metals, then, using a drying and calcining step. However, the raw material powder cannot provide satisfactory lower temperature sintering characteristics nor enough relative density of the sintered body.

In this process, aqueous ammonium is used for precipitation. Some salts of the other transition metals will form an amine complex with ammonium so that in practice aqueous ammonium cannot be used in the case of such other transition metal compounds.

In order to avoid this shortcoming, there is a process in which the oxides of the other transition metals are used in place of the water soluble salt of the transition metals so as to disperse in the mixed solution containing the other components, whereas the hydroxides of the other metal components are co-precipitated together with oxides of these transition metals. However, in this process, the surface of the oxide of the transition metal is coated with the hydroxides of the other components. Therefore, it is difficult to impart satisfactory effect for sintering activator by the oxide of the transition metal in the sintered body by small amounts of the addition.

It was reported that the content of $Y_2O_3$ in the sintered body can be decreased to 2.0 mol. % (parts per hundred) in $Y_2O_3$ partially stabilized zirconia sintered body so that the fracture toughness (KIc) of approximately 10 $MN/m^{3/2}$ can be obtained from the sintered body having high tenacity.

This means that a partially stabilized zirconia sintered body containing $Y_2O_3$ content in the sintered body in an amount ranging to nearly 2 mol. % (parts per hundred) can evidence relatively high tenacity and strength.

As already explained, the reduction of $Y_2O_3$ content in the $Y_2O_3$ partially stabilized zirconia sintered body is important in the view of the high tenacity of the sintered body and can be attained by suppressing the growth of the crystal grain in the sintered body.

However, the suppressing of the grain growth in the sintered body to control the size of the grain to a grain size of the order of, equal to or less than 0.2 μm is extremely difficult by the prior art process for the production of the sintered body. The characteristics of sintering at the lower temperature so that the grain size can be controlled to approximately 0.2 μm or less cannot be attained, even by using raw material powder prepared by the co-precipitation technique. Therefore, the $Y_2O_3$ content in the $Y_2O_3$ partially stabilized zirconia sintered body has a lower limit of about 2 mol. % (parts per hundred). A very strong $Y_2O_3$ partially stabilized zirconia sintered body having a $Y_2O_3$ content of less than 2 mol. % (parts per hundred) is not known.

A partially stabilized zirconia with a $Y_2O_3$ content approximating 2 mol. % (parts per hundred) has a problem of heat deterioration and therefore, the prior art $Y_2O_3$ partially stabilized zirconia uses ordinarily the range of about 3 mol. % (parts per hundred) for the $Y_2O_3$ content. This known partially stabilized zirconia is not satisfactory from the standpoint of improving the mechanical strength and stability, and therefore, a sintered body with greater tenacity and strength has been greatly desired.

There is known in Japanese Patent Laid Open No. 60-86073 (1985) a method to improve the mechanical properties of partially stabilized zirconia sintered body by adding of alumina in the composition of the sintered body. However, such known partially stabilized zirconia sintered body containing alumina is produced by special sintering techniques such as HIP process, and therefore, the produced sintered body will be very expensive.

OBJECTS OF THE INVENTION

It is therefore an object of this invention to provide a process for the production of the raw material powder with the characteristics of sintering at low temperatures, which can be used for the production of the dense zirconia sintered body, as well as a process for the production of the dense zirconia sintered body with controlled crystal structure.

It is another object of the invention to provide a $Y_2O_3$ partially stabilized zirconia sintered body with a high fracture tenacity, having a novel composition as well as a method for the production of such a zirconia sintered body.

It is a further object of the present invention to provide a partially stabilized zirconia sintered body containing alumina as well as a process for the production of such a zirconia sintered body.

SUMMARY OF THE INVENTION

Generally speaking the present invention comprises a process for the production of a sinterable raw material powder used for the production of a zirconia sintered body. This is accomplished by adding powder principally containing zirconium compound(s) together with a stabilizing agent(s), into a solution or slurry containing at least one specie of other transition metal compound(s) to form a suspension, then, removing the solvent from the slurry and drying to obtain the desired powder product, as well as a process for the production of high density zirconia sintered bodies, which comprises molding and sintering the raw material powder prepared by the foregoing process.

Also, according to the inventive concept, the $Y_2O_3$ partially stabilized zirconia sintered body is characterized by the $Y_2O_3$ content in a range of more than or equal to 1.3 mol. percent (parts per hundred) and less than 2.0 mol. percent, and the content of the tetragonal phase being 65% or more, and the alumina-containing partially stabilized zirconia sintered body being characterized by the following composition:

partially stabilized zirconia; 99 to 40 mol. parts per hundred of the combination of partially stabilized stabilized zirconia and α-alumina α-alumina; 1 to 60 mol. parts per hundred, and, a metal oxide of other transition metal 0.0001 to 0.01 (0.01 part per hundred) of the atomic ratio of the other transition metals to the combination of Zr plus Al which are produced by the foregoing process The zirconium compound used in this invention may be at least one material selected from the group consisting of oxide, hydroxide, carbonate, oxychloride, oxynitrate, oxysulfate, alkoxide, oxyacetate, and the like. Also, the aluminium compound used in this invention may be at least one material selected from the group consisting of oxide, hydroxide, carbonate, chloride, nitrate sulfate, alkoxide, acetate, and the like.

The other transition metal compounds in this invention may be an oxide of at least one metal selected from the group consisting of Mn, Fe, Co, Ni, Cu, and Zn, as well as the compound(s) to generate one of these metal oxides by thermal decomposition.

As the compound of the other transition metal, it is possible to use inorganic compounds, such as oxides, hydroxides, carbonates, nitrates, chlorides and the like of these metals; organic acid salts such as oxalates, acetates, propionates, higher fatty acid salts and the like of these metals, and, organic metal compounds such as alkoxide compounds, chelate compounds and the like of these metals, even if it is not only soluble but also insoluble to the solvents used. However, it is preferable to use soluble compounds.

The stabilizing agent used in this invention may include $Y_2O_3$, CaO, MgO or $CeO_2$, as well as compounds such as hydroxide, chloride, nitrate, sulfate, alkoxide, acetate and the like of Y, Ca, Mg, or Ce, to generate $Y_2O_3$, CaO, MgO or $CeO_2$, respectively, by thermal decomposition.

Also, according to the inventive concept, the powder principally containing zirconium compound(s) includes:

(a) zirconia powder containing a stabilizing agent or zirconia powder containing alumina and a stabilizing agent, and, (b) precursor powder to generate zirconia containing a stabilizing agent or zirconia containing alumina and a stabilizing agent by thermal decomposition All of the foregoing can be stabilized by adding the foregoing stabilizing agents.

The Production of Raw Material Powder

The foregoing powder principally-containing zirconium compounds is obtained by the conventional process such as the oxide method, co-precipitation method, hydrolysis method, pyrolysis method and the like.

It is preferable to use a precursor powder which is obtained by drying the co-precipitated hydroxides, mixed carbonates or organic acid salts prepared by adding aqueous ammonium, ammonium carbonate or ammonium salt of an organic acid such as ammonium oxalate, ammonium acetate as a precipitating agent to the mixed solution containing water soluble zirconium compounds, as well as water soluble yttrium compounds, water soluble magnesium compounds, water soluble calcium compounds, or water soluble cerium compounds, and, if desired, alumina powder, or water soluble aluminum compounds.

The powder principally containing zirconium compounds is added to the solution or slurry containing the transition metal compound, and then, the desired raw material powder is obtained by removing solvent from the suspended slurry and drying the residue.

The solvent used for dissolving or suspending the transition metal compound may be water and/or organic solvents, and the organic solvent is preferable because of convenient removal of the solvent by evaporation and because of less evaporation energy at drying. The usable organic solvents is not limited, but the use of the highly viscous solvents is not desirable because a homogeneous suspension of the powder principally containing zirconium compounds and containing the other transition metal compounds is difficult, and further, the removal and drying of the solvent is difficult. Preferably, lower alcohols such as methanol, ethanol, propanol, butanol, and the like can be used.

The unit operation for suspending the powder principally containing zirconium compounds into the solution or slurry containing the other transition metal compounds can be a simple agitating operation resulting in a satisfactory mixture, but when grinding and mixing such as milling is applied, the resultant mixing effect will be more certain. The removal of solvent(s) and drying are carried out by the conventional evaporation method, but when the other transition metal compound is insoluble in water or organic solvent(s), or when the precipitation has already been obtained by applying a precipitating agent to the solution containing the soluble other transition metal compound, the solvent can be removed by filtration. Further, spray drying can be used to efficiently treat the powder material effectively on a large scale.

The resulting raw material powder can be used for the production of a sintered body, as, and also, it can be calcined at a temperature in the range of from 300° to 1200° C. for further treatment.

In the raw material powder obtained by the foregoing process, the transition metal compounds other than the zirconia, uniformly adhere to and coat the surface of the raw material powder so that it functions effectively as a sintering activator.

The Production of Sintered Body

The raw material powder will then produce a dense sintered body by easy sintering through firing under atmospheric pressure at the relatively low temperature range of from about 1100° to 1500° C.

The atomic ratio of the other transition metal to Zr, or the combination of Zr plus Al may be 0.0001 to 0.01 preferably, 0.0001 to 0.005, provided that the combination of Zr plus Al is used if the raw material powder contains alumina.

When the atomic ratio of the other transition metal is less than 0.0001, the effect for activating sinter is insufficient. Further, when it is more than 0.01, the properties of the resultant sintered body will be affected and the range of more than 0.01 should be avoided.

In accordance with the present invention, the partially stabilized zirconia sintered body is produced by molding the raw material powder obtained by the foregoing process and then by sintering the molded body.

The molding may be press molding by using the conventional molding technique, but it is preferable to apply a further hydrostatic compressing after lower pressure molding, so as to improve the sintered density and the mechanical strength of the finished sintered body. The sintering may be by any of the known methods, and by sintering under atmospheric pressure, the object being sintered is sufficiently improved. Generally, the sintering temperature can be in the range of from 1100° to 1700°.

In order to control the growth of grain in the sintered body for the production of a dense sintered body, particularly a very strong partially stabilized zirconia sintered body, the lower sintering temperature is preferred, and therefore, the range of 1200° to 1500° C. is preferable. In accordance with this method, since the raw material powder has good sintering characteristics, the use of the atmospheric firing at the lower temperature can easily produce a dense sintered body, having a relative density in relation to the theoretical density of more than 99%.

(i) $Y_2O_3$ Partially Stabilized Zirconia Sintered Body

According with the present inventive concept, a $Y_2O_3$ partially stabilized zirconia sintered body having a tetragonal phase content of 65% or more, and high tenacity and high strength can be obtained by limiting the raw material powder to the zirconia powder containing $Y_2O_3$ or precursor powder to generate zirconia containing $Y_2O_3$, by its thermal decomposition, in which the powder has a crystal particle size of 400 Å or less and a BET specific surface area of 2 $m^2/g$ or more.

In the production of the sintered body, when the crystal particle size of the powder principally containing zirconia compounds exceeds 400 Å, or when the BET specific surface area is less than 2 $m^2/g$, the sinter activating effect by the transition metal compound(s) is insufficient and then a sufficient amount of dense ceramics of high density cannot be obtained by atmospheric sintering at a low temperature.

The atomic ratio of the other transition metal to Zr in the production of the sintered body may be in the range of from 0.0001 to 0.01, preferably 0.0001 to 0.005.

The sintering temperature is preferably not more than 1400° C.

By using the process described for the production of the sintered body, a novel $Y_2O_3$ partially stabilized zirconia sintered body having a $Y_2O_3$ content of 1.3 mol. parts per hundred or more, and less than 2.0 mol. parts per hundred and having a tetragonal phase content of 65% or more can be produced. The $Y_2O_3$ content is based on the total combination of $Y_2O_3$ plus $ZrO_2$ in the sintered body. The sintered body obtained has a sintered density of at least 5.8 $g/cm^3$, preferably more than 5.9 $g/cm^3$, and preferably 6.0 $g/cm^3$ or more, and a fracture tenacity value (KIc) in the range of from 10 $MN/m^{3/2}$ to 16 $MN/m^{3/2}$ and therefore has high density, high tenacity and great strength. The size of the grain in the sintered body may be 0.5 $\mu m$ or less, preferably 0.3 $\mu m$ or less, and the content of the tetragonal phase in the sintered body is 65% or more, preferably 80% or more. When the $Y_2O_3$ is less than 1.3 parts per hundred, the content of the monoclinic phase will increase and the tetragonal phase content of 65% or more is difficult to maintain. On the other hand, the sintered body having a $Y_2O_3$ content of 2.0 mol. per hundred or more, have been known, and the fracture tenacity value thereof cannot be more than 10 $MN/m^{3/2}$.

When the size of the grain in the sintered body exceeds 0.5 $\mu m$, it is extremely difficult to keep the content of the tetragonal phase to 65% or more. In addition, when the grain size is 0.3 $\mu m$ or less, the stability of the sintered body under heat stress will be improved as well as the mechanical strength of the sintered body which will then be stable.

Further, when the sintering temperature exceeds 1400° C., the grain growth in the sintered body will be activated, and the grain size will become more than 0.5 $\mu m$, and then, only the sintered body having a relatively higher content of the monoclinic phase will be produced, and further, cracks may be caused during firing.

The atomic ratio of the other transition metal to Zr in the raw particulate powder material may range from 0.01 to 1.0 parts per hundred. When the atomic ratio exceeds 1.0 parts per hundred, the characteristics of the sintered body will be undesirably affected.

(ii) Partially Stabilized Zirconia Sintered body containing alumina

In the case of the present invention, the novel alumina containing partially stabilized zirconia sintered body comprising the composition of partially stabilized zirconia of about 99 to about 40 mol. parts per hundred of the combination of partially stabilized zirconia and alumina; zirconia; α-alumina of about 1 to about 60 mol. parts per hundred and transition metal oxide having an atomic ratio thereof to the combination of Zr plus Al ranging from about 0.0001 to about 0.01 parts can be produced.

The resultant sintered body has so high a tenacity and high hardness, that the fracture tenacity is 18.5 MN/m$^{3/2}$, and the Vickers hardness reaches 1600 kg/mm$^3$, as well as excellent heat shock resistance.

The type of powder principally containing the zirconium compound material which can be used for the production of the sintered body may be (a) mixed powder comprising zirconia containing a stabilizer of about 99 to about 40 mol. parts per hundred of the combination of zirconia containing a stabilizer and alumina, and alumina of about 1 to about 60 mol. parts per hundred of the combination of zirconia containing a stabilizer and alumina, or (b) precursor powder to produce the foregoing powder by thermal decomposition, and the powder is added to the solution or slurry containing the other transition metal compound to form a suspension, then followed by the removal of the solvent and drying to obtain a raw material powder with the transition metals compounds to form the suspension, then, followed by the removal of solvent therefrom and drying to obtain a powder raw material having the other transition metal as a coating in the atomic ratio of the other transition metal(s) to the combination of Zr plus Al ranging from 0.0001 to 0.01. Then, the material is molded into shape and fired to sinter, the result being the desired sintered body. The sintered body may be $Y_2O_3$ partially stabilized zirconia having $Y_2O_3$ content in a range from about 1.3 to 4 mol parts per hundred or $Y_2O_3$ partially stabilized zirconia wherein a part or all of the $Y_2O_3$ for stabilizer is substituted by MaO, MgO, or $CeO_2$ in an amount of about 0.01 to about 12 mol parts per hundred.

The content of the stabilizing agent such as $Y_2O_3$ is based on the total amount of $ZrO_2$ and the presumed oxide for the stabilizing agent.

In the case of $Y_2O_3$ partially stabilized zirconia, when the $Y_2O_3$ content is less than 1.3 mol parts per hundred, the ratio of the monoclinical phase in the sintered body will increase even in the presence of $Al_2O_3$, and then, it is difficult to keep the ratio of tetragonal phase of 65% or more. When the $Y_2O_3$ content exceeds 4 mol parts per hundred the fracture tenacity value of the sintered body will decrease.

When the $Al_2O_3$ content in the sintered body is less than 1 mol parts per hundred, sufficient hardness cannot be attained. Further, when the $Al_2O_3$ content is more than 60 mol per hundred, it is difficult to produce enough dense sintered body having high density.

When the atomic ratio of the transition metal element to the combination of Zr plus Al in the sintered body is less than 0.0001, the dense sintered body with high density cannot be obtained. Further, when such atomic ratio is more than 0.01, the sintering characteristics of the sintered body will be degraded. The grain size of the partially stabilized zirconia in the sintered body may be 2 μm or less, and preferably 0.5 μm or less. The content of the tetragonal phase in the sintered body may be 65% or more, and preferably 80% or more. The grain size of $Al_2O_3$ in the sintered body may be 4 μm or less, preferably 2 μm or less.

The resultant alumina containing partially stabilized zirconia sintered body has extremely high hardness such as Vickers hardness in the range of from 1100 to 1600 Kg/mn$^3$, and particularly excellent heat resistance characteristics such as bending strength of 85 Kg/mm$^2$ or more, even after heat treatment at 200° C. for 1000 hours.

In the production of the raw material powder, the powder principally containing zirconium compounds may be a mixture of zirconia powder containing a stabilizing agent having a crystal particle size of 400 Å or less, and BET specific surface area of 2 m$^2$/g or more; or the precursor powder to generate zirconia containing a stabilizing agent by its thermal decomposition, and; α-alumina powder having a crystal particle size of 1.0 μm or less, and BET specific surface area of 2 m$^2$/g or more, or the presursor powder to generate alumina by thermal decomposition.

When zirconia powder containing a stabilizing agent or precursor powder has a crystal particle size of more than 400 Å, or when the BET specific surface area thereof is less than 2 m$^2$/g, the sinter activating effect by the other transition metal element will decrease, so that the atmospheric sintering at less than 1500° C. cannot produce a sufficient amount of high density ceramic.

BEST MODE FOR CARRYING OUT THE INVENTION

For the purpose of giving those skilled in the art a better understanding of the invention, the following illustrative examples are given:

EXAMPLE 1

Production of sinterable raw material powder and sintered body (i) Production of Raw Material Powder used for the production of a sintered body Sample (1-1)

To the combined solution containing $ZrOCl_2$, and $YCl_3$ in the ratio of $Y_2O_3/(Y_2O_3-ZrO_2)$-0.03 by oxide molar base calculation, aqueous ammonia was added to regulate the pH of the solution to 10 in order to produce co-precipitation of the combined hydroxides. The resultant co-precipitation hydroxides were filtered and dried, and then the precursor powder of zirconia containing $Y_2O_3$ was obtained. By calcining a part of the precursor powder so obtained at 800° C. for one hour, powder of zirconia containing $Y_2O_3$ was obtained.

For the other transition metal compounds, the following compounds were dissolved or dispersed in ethanol to prepare a solution of slurry of these metal compounds:

| Solution | Slurry |
| --- | --- |
| Mn:Mn(CH$_3$COO)$_2$.4H$_2$O | MnO$_2$ |
| Fe:Fe(NO$_3$)$_3$.9H$_2$O | Fe(OH)$_3$ |
| Co:Co(CH$_3$COO)$_2$.4H$_2$O | CoO |
| Ni:Ni(NO$_3$)$_2$6H$_2$O | Ni(OH)$_2$ |
| Cu:Cu(CH$_3$COO)$_2$ | CuO |

| -continued | |
|---|---|
| Solution | Slurry |
| Zn:Zn(CH$_3$COO)$_2$.2H$_2$O | ZnO |

To the prepared solution or slurry of the transition metal compounds other than Zr, the zirconia powder containing Y$_2$O$_3$ was prepared as before, and added to form the suspension, then, distilling away ethanol, and drying to obtain raw material powder (1-1) coated with the other transition metal compounds which are used for the production of Y$_2$O$_3$, partially stabilized zirconia sintered body.

Sample (1-2)

Under the same conditions for the production of Sample (1-1) except for using the precursor powder of zirconia containing Y$_2$O$_3$ in place of the powder of zirconia containing Y$_2$O$_3$, the resultant material was prepared, and then, the resultant material was calcined at 800° C. for one hour yielding Y$_2$O$_3$ partially stabilized zirconia raw material powder (1-2) used for the production of the zirconia sintered body.

Sample (1-3)

The pH of the mixed solution containing ZrOCl$_2$ and CaCl$_2$ in the ratio of CaO/CaO-ZrO$_2$)-0.12 by oxide molar calculation for the oxides was adjusted to 10 by adding aqueous ammonia to co-precipitate mixed hydroxides. The co-precipitated mixed hydroxides were filtered, dried and then calcined at 800° C. for one hour to obtain zirconia powder containing CaO.

The prepared zirconia powder containing CaO was treated under the same conditions as sample (1-1) with the same transition metal compounds, obtaining the raw material powder (1-3) in use for the production of the partially stabilized zirconia sintered body containing CaO.

Sample (1-4)

The pH of the mixed solution containing ZrOCl, and MgCl$_2$ in the ratio of MgO/MgO-ZrO$_2$)-0.081 by molar calculation for the oxides was adjusted to 11 by adding aqueous ammonia to co-precipitate mixed hydroxides. The co-precipitated mixed hydroxides were filtered, dried and then calcined at 800° C. for one hour to obtain zirconia powder containing MgO.

The prepared zirconia powder containing MgO was treated under the same conditions as sample (1-1) with the transition metal compound, obtaining the raw material powder (1-4) in use for the production of the partially stabilized zirconia sintered body containing MgO.

Sample (1-5)

The mixed solution containing ZrOCl$_2$ and CeCl$_4$ in the ratio of CeO$_2$/(CeO$_2$-ZrO$_2$)-0.08 by oxide molar calculation for the oxides was adjusted by adding aqueous ammonia to precipitate mixed hydroxides. The precipitated mixed hydroxides were filtered, dried and calcined at 800° C. for one hour to obtain zirconia powder containing CeO$_2$.

The prepared zirconia powder containing CeO$_2$ was treated under the same conditions as sample (1-1) with the transition metal compound obtaining the raw material powder (1-5) in use for the production of the partially stabilized zirconia sintered body containing CeO$_2$.

Reference Sample (C1-1)

To the starting mixed aqueous solution used for the production of the precursor powder as in Sample (1-1), the following transition metal compound was added: Mn:Mn(OH$_3$COO)$_2$•4H$_2$O or MnO$_2$, Fe:Fe(NO$_3$)$_3$•(H$_2$O or Fe(OH)$_3$, Zn:Zn(OCOCH$_3$)$_2$.2H$_2$O or ZnO and Cu:Cu(CH$_3$COO)$_2$ or CuO. This compound was then treated to precipitate mixed hydroxides containing the transition metal compound and then the precipitated mixed hydroxides were filtered and dried obtaining raw material powder (Cl-1) for reference.

(Reference Sample (C1-2)

The treatment of the preparation of Sample (1-1) was carried out but omitting the deposition of the transition metal compound other than zirconium, so as to prepare zirconia precursor powder containing a yttrium compound which was referred to as the raw material powder (C1-2) for reference (hereinafter called "untreated powder").

Reference Sample (C1-3)

"Untreated powder" of zirconia containing CaO produced by the process for the production of Sample (1-3) was used as the raw material powder (C1-3) for reference.

Reference Sample (C1-4)

"Untreated powder" of zirconia containing MgO which was then prepared by omitting the deposition of the transition metal compound for the preparation process for Sample (1-4) was used as the raw material powder (C1-4) for reference.

Reference Sample (C1-5) "Untreated powder of zirconia containing CeO$_2$ also prepared by omitting the deposition of the transition metal compound for the preparation method of Sample (1-5) was used as the raw powder (C1-5) for reference.

(2) Production of the sintered body

By pressure molding the raw material powder as obtained before under pressure of 200 Kg/cm$^2$, using a mold, and then hydrostatic compression of the molding obtained under pressure of 2 ton/cm$^2$, moldings having the desired shape were obtained. The moldings obtained were fired under atmospheric pressure at the given temperature for three hours producing a zirconia sintered body.

(4) Evaluation Test

The density of the resultant sintered body was measured and the three point bending test of a portion thereof based on JIS (Japan Industrial Standard) R 1601 (1981) was carried out.

Table 1 indicates the results of the tests on raw material powder; Samples (1-1), (1-2) and reference Samples (C1-1), (C1-2); in atomic ratio of the other transition metal to Zr in parts per hundred, the density and relative humidity density to the theoretical density of the resultant Y$_2$O$_3$ partially stabilized zirconia sintered body produced from each raw material and bending strength (average from 5 points) of the resultant sintered body.

Table 2 indicates the results of the tests on raw material powder; Samples (1-3), (1-4), (1-5) and reference Samples (C1-3) to (C1-5) in the atomic ratio of the other transition metal to Zr, the density and relative density to the theoretical density of the resultant Y$_2$O$_3$ partially stabilized zirconia sintered body produced from each raw material and bending strength (average from 5 points) of the resultant sintered body. The theoretical density of each sintered body are as follows:

Y$_2$O$_3$ partially stabilized zirconia sintered body 6.10/g/cm$^3$

CaO partially stabilized zirconia sintered body 5.68 g/cm$^3$

MgO partially stabilized zirconia sintered body 5.80 g/cm$^3$

CeO₂ partially stabilized zirconia sintered body 6.23 g/cm³ means that the other transition metal compound was coated using a slurry.

TABLE 1

| | raw material transition metal coat method | coated ratio atom PPH | 1200° C. firing | | | 1300° C. firing | | |
|---|---|---|---|---|---|---|---|---|
| | | | sintered density g/cm³ | relative density % | bend strength kg/mm² | sintered density g/cm³ | relative denstiy % | bend strength kg/mm² |
| 1-2 | Mn (A) | 0.3 | 5.90 | 96.7 | — | 5.98 | 98.0 | — |
| 1-1 | Mn (A) | 0.05 | 5.90 | 96.7 | — | 6.00 | 98.4 | — |
| | Mn (A) | 0.1 | 5.95 | 97.5 | — | 6.01 | 98.5 | — |
| | Mn (A) | 0.2 | 5.97 | 97.9 | — | 6.02 | 98.7 | — |
| | Mn (A) | 0.3 | 5.96 | 97.6 | — | 6.02 | 98.7 | 100 |
| | Mn (A) | 1.0 | 5.94 | 97.4 | — | 6.02 | 98.7 | — |
| | Mn (B) | 0.05 | 5.82 | 95.4 | — | 5.93 | 97.2 | — |
| | Mn (B) | 0.1 | 5.88 | 96.7 | — | 5.97 | 97.9 | — |
| | Mn (B) | 0.2 | 5.90 | 96.7 | — | 5.99 | 98.2 | — |
| | Mn (B) | 0.3 | 5.91 | 96.9 | 95 | 6.00 | 98.4 | 100 |
| | Mn (B) | 1.0 | 5.90 | 96.7 | — | 6.00 | 98.4 | — |
| | Fe (A) | 0.05 | 5.72 | 93.9 | — | 5.92 | 97.0 | — |
| | Fe (A) | 0.1 | 5.73 | 93.9 | — | 5.94 | 97.4 | — |
| | Fe (A) | 0.2 | 5.84 | 95.7 | — | 6.02 | 98.7 | — |
| | Fe (A) | 0.3 | 5.84 | 95.7 | — | 6.03 | 98.9 | 101 |
| | Fe (B) | 0.3 | 5.80 | 95.1 | 84 | 5.98 | 98.0 | 98 |
| | Co (A) | 0.05 | 5.89 | 96.6 | — | 5.99 | 98.2 | — |
| | Co (A) | 0.1 | 5.95 | 97.5 | — | 6.00 | 98.4 | — |
| | Co (A) | 0.2 | 5.89 | 96.6 | — | 6.02 | 98.7 | — |
| | Co (A) | 0.3 | 5.87 | 96.2 | — | 6.02 | 98.7 | 100 |
| | Co (B) | 0.3 | 5.84 | 95.7 | 88 | 5.98 | 98.0 | 90 |
| 1-1 | Ni (A) | 0.05 | 5.89 | 96.6 | 90 | 5.99 | 98.2 | 90 |
| | Ni (A) | 0.1 | 5.92 | 97.0 | 90 | 5.99 | 98.2 | 95 |
| | Ni (A) | 0.2 | 5.99 | 98.2 | 93 | 6.02 | 98.7 | 98 |
| | Ni (A) | 0.3 | 6.02 | 98.7 | 96 | 6.07 | 99.5 | 110 |
| | Ni (A) | 1.0 | 6.01 | 98.5 | 86 | 6.07 | 99.5 | 90 |
| | Ni (B) | 0.3 | 5.94 | 97.4 | 90 | 5.98 | 98.0 | 98 |
| 1-2 | Zn (A) | 0.3 | 5.90 | 96.7 | 85 | 6.02 | 98.7 | 100 |
| 1-1 | Zn (A) | 0.05 | 5.88 | 96.4 | 80 | 6.05 | 99.2 | 105 |
| | Zn (A) | 0.1 | 5.90 | 96.7 | 80 | 6.07 | 99.5 | 113 |
| | Zn (A) | 0.2 | 5.99 | 98.2 | 90 | 6.08 | 99.7 | 115 |
| | Zn (A) | 0.3 | 5.99 | 98.2 | 90 | 6.07 | 99.5 | 115 |
| | Zn (A) | 1.0 | 5.98 | 98.0 | 74 | 6.07 | 99.5 | 90 |
| | Zn (B) | 0.3 | 5.94 | 97.4 | 87 | 6.01 | 98.5 | 100 |
| 1-2 | Cu (A) | 0.3 | 6.01 | 98.5 | 88 | 6.03 | 98.9 | 99 |
| 1-1 | Cu (A) | 0.05 | 5.96 | 97.7 | 92 | 6.05 | 99.2 | 108 |
| | Cu (A) | 0.1 | 5.99 | 98.2 | 95 | 6.07 | 99.5 | 115 |
| | Cu (A) | 0.2 | 6.02 | 98.7 | 99 | 6.09 | 99.8 | 120 |
| | Cu (A) | 0.3 | 6.05 | 99.2 | 105 | 6.07 | 99.5 | 113 |
| | Cu (A) | 1.0 | 6.05 | 99.2 | 90 | 6.05 | 99.2 | 90 |
| | Cu (B) | 0.05 | 5.92 | 97.0 | — | 6.01 | 98.5 | — |
| | Cu (B) | 0.1 | 5.96 | 97.7 | — | 6.01 | 98.5 | — |
| | Cu (B) | 0.2 | 5.96 | 97.7 | — | 6.02 | 98.7 | — |
| | Cu (B) | 0.3 | 5.98 | 98.0 | 95 | 6.02 | 98.7 | 98 |
| C1-1 | Mn (A) | 0.3 | 5.33 | 84.4 | — | 5.50 | 90.2 | — |
| | Mn (B) | 0.3 | 5.25 | 86.1 | 38 | 5.50 | 90.2 | 65 |
| | Fe (A) | 0.3 | 5.38 | 88.2 | — | 5.70 | 93.4 | — |
| | Fe (B) | 0.3 | 5.30 | 86.9 | 43 | 5.55 | 91.0 | 68 |
| | Zn (A) | 0.3 | 5.38 | 88.2 | 43 | 5.60 | 91.8 | 52 |
| | Zn (B) | 0.3 | 5.28 | 86.6 | 40 | 5.48 | 89.8 | 69 |
| | Cu (B) | 0.3 | 5.30 | 86.9 | 42 | 5.52 | 90.5 | 60 |
| C1-2 | — | — | 5.28 | 86.6 | 40 | 5.48 | 89.8 | 69 |

(note - PPH = parts per hundred)

In the following tables (A) means that the other transition metal was coated by the use of a solution; and (B)

TABLE 2

| | raw material transition metal coat method | coated ratio atom PPH | 1200° C. firing | | | 1300° C. firing | | |
|---|---|---|---|---|---|---|---|---|
| | | | sintered density g/cm³ | relative density % | bend strength kg/mm² | sintered density g/cm³ | relative denstiy % | bend strength kg/mm² |
| E1-3 | Mn (A) | 0.3 | 5.24 | 95.5 | — | 5.56 | 97.9 | — |
| | Fe (A) | 0.3 | 5.56 | 96.1 | — | 5.63 | 99.1 | — |
| | Co (A) | 0.3 | 5.14 | 95.5 | — | 5.61 | 98.8 | — |
| | Ni (A) | 0.3 | 5.23 | 97.4 | — | 5.67 | 99.8 | — |
| | Zn (A) | 0.3 | 5.23 | 97.1 | — | 5.57 | 98.1 | — |
| | Cu (A) | 0.3 | 5.55 | 97.7 | — | 5.67 | 99.8 | — |
| 1-4 | Mn (A) | 0.3 | 5.73 | 98.8 | — | — | — | — |
| | Fe (A) | 0.3 | 5.76 | 99.3 | — | — | — | — |

TABLE 2-continued

| | coat method | raw material transition metal coated ratio atom PPH | 1200° C. firing sintered density g/cm³ | 1200° C. firing relative density % | 1200° C. firing bend strength kg/mm² | 1300° C. firing sintered density g/cm³ | 1300° C. firing relative denstiy % | 1300° C. firing bend strength kg/mm² |
|---|---|---|---|---|---|---|---|---|
| | Co (A) | 0.3 | 5.69 | 98.1 | — | — | — | — |
| | Ni (A) | 0.3 | 5.69 | 98.1 | — | — | — | — |
| | Zn (A) | 0.3 | 5.71 | 98.4 | — | — | — | — |
| | Cu (A) | 0.3 | 5.69 | 98.1 | — | — | — | — |
| 1-5 | Mn (A) | 0.3 | 6.20 | 99.5 | — | 6.21 | 99.7 | — |
| | Ni (A) | 0.3 | 6.18 | 99.1 | — | 6.20 | 99.5 | — |
| | Cu (A) | 0.3 | 6.22 | 99.8 | — | 6.22 | 99.8 | — |
| C1-3 | — | — | 4.85 | 85.4 | — | 5.30 | 93.8 | — |
| C1-4 | — | — | 5.43 | 93.6 | — | — | — | — |
| C1-5 | — | — | 5.80 | 93.1 | — | 5.98 | 96.0 | — |

(note - PPH = parts per hundred)

EXAMPLE 2

$Y_2O_3$ Partially Stabilized Zirconia Sintered Body and its Production (1) Preparation of raw material powder The same procedure as that used for the production of Sample (1-1) in Example 1 was carried out in changing the mixture ratio of $ZrOCl_2$ and $YCl_3$ to produce co-precipitates of hydroxides.

The co-precipitates of the hydroxides so obtained were treated under the same conditions as for those of Example 1 to produce zirconia powders of different $Y_2O_3$ contents.

Sample (2-1)

The resultant zirconia powders containing $Y_2O_3$ were treated with the solution in Example 1 under similar conditions to produce raw material powder (2-1) used for the production of a sintered body.

Sample (2-2)

The dried co-precipitates of hydroxide were treated in a similar manner to that as for sample (2-1), and further, calcined at 800° C. for one hour to produce raw material powder (2-2 in use for the production of a sintered body.

Sample (2-3)

The zirconia powders containing $Y_2O_3$ produced as before were treated with a slurry used in Example 1 under similar conditions to produce the raw powder material (2-3).

(2) Production of a Sintered Body

Raw material powders (2-1) to (2-3) were molded under similar conditions as that of Example 1 and fired in atmosphere for 3 hours at the given temperature to produce $Y_2O_3$ partially stabilized zirconia sintered body.

For reference, omitting the treatment with the other transition metal compounds, the raw material powder wherein the $Y_2O_3$ content is less than 1.3 mol. percent, the crystal particle size is more than 400 Å, and the atomic ratio of the other transition metal to Zr is more than 1.0% were used to mold and produce the sintered body. The firing temperature was 1500° C.

(3) Characteristics of the Zirconia Powder Containing $Y_2O_3$ and the Sintered Body made therefrom.

The following characteristics were measured on the zirconia powder containing $Y_2O_3$ and the sintered body made in the foregoing items (1) and (2).

Table 3 shows the characteristics of the raw material powder (2-1) and of the sintered body produced from that raw material powder.

Table 4 shows the characteristics of raw material powder (2-2) and (2-3) and the sintered body produced from those materials.

(A) Particle Crystal Size of zirconia powder containing $Y_2O_3$: D

The size D can be calculated from the width at the half value of the peak X-ray diffraction by the following Schellar's formula:

| $D = 0.9\lambda/\beta \cos \theta$ | $\lambda$: the wave length of X-ray $\beta$: the width at the half value of the diffraction peak $\theta$: the diffraction angle |
|---|---|

(B) BET relative surface area of zirconia powder containing $Y_2O_3$ was measured using micromeritics (machine manufactured by Shimazu Works).

(C) Fracture tenacity of partially stabilized zirconia sintered body: KIc was measured by Vickers indent test.

The Vickers indenter was pressed to the polished surface of the samples, and the resulting indentation size and the resulting length of the crack generated were measured and KIc was calculated from the following formula which Niihara et al proposed. The applied indentation load was 50 kgf.

(KIc0 / $Ha^{1/2}$)($H/E0$)$^{0.4}$-0.035 $(l/a)^{1/2}$

0: restraint modules
H: Vickers hardness
E: modulus of elasticity
a: half value of diagonal length of indentation
l: length of crack generated from indentation (D) Bending strength of partially stabilized zirconia sintered body was measured in accordance with JIS R 1601 (1981) rule. The sample of 3×4×40 mm in size was used, and measurement was carried out on a span length of 30 mm under crosshead speed of 0.5 mm/min. and the value was determined by the average from five samples.

(E) Content of the tetragonal phase in the partially stabilized zirconia sintered body.

The surface of the sample was polished by a diamond slurry containing 3 μm in size of diamond particles, and then, X-ray diffraction measurement was carried out on that surface followed by the calculation of the following formula.

Tetragonal phase content (%) =

-continued $$\frac{(111)t}{(111)t + (111)m + (11\bar{1})m} \times 100$$

(111)t: tetragonal (111) plane diffraction intensity
(111)m: monoclinic (111) plane diffraction intensity
(11ī)m: monoclinic (11ī) plane diffraction intensity (111)t diffraction peak includes cubic (iii)c diffraction peak, but the calculation was carried out presuming that the peak is entirely by tetragonal diffraction.

(F) Grain size in the partially stabilized zirconia sintered body

The grain size was measured by observing the fracture face of the sintered body through a scanning type electron microscope. It was confirmed that all samples except the reference samples have a grain size ranging from 0.1 to 0.3 μm.

TABLE 3

| | | raw material powder | | | | | | | |
|---|---|---|---|---|---|---|---|---|---|
| | metal kind. | adhered atom. ratio PPH | $Y_2O_3$ content mol. % | crystal particl. size A | BET specific surface Area $m^2/g$ | firing temperature °C. | sintered density $g/cm^3$ | fracture tenacity $MN/m^{3/2}$ | bending strength $Kg/mm^2$ | tetragonal content % |
|---|---|---|---|---|---|---|---|---|---|---|
| | Mn | 0.05 | 1.7 | 230 | 28.5 | 1200 | 5.92 | 15.3 | 138 | 90 |
| | | 0.1 | 1.7 | 230 | 28.5 | 1200 | 5.95 | 15.2 | 146 | 92 |
| | | " | 2.0 | 218 | 25.6 | 1200 | 5.01 | 9.5 | 128 | — |
| | | 0.3 | 1.3 | 231 | 28.8 | 1100 | 5.93 | 13.8 | 150 | 85 |
| | | " | 1.7 | 230 | 28.5 | 1200 | 6.01 | 14.8 | 164 | >95 |
| | | " | " | 230 | 28.5 | 1300 | 6.03 | 16.0 | 174 | >95 |
| | | " | " | 380 | 6.4 | 1300 | 6.03 | 15.7 | 147 | 93 |
| | | " | 1.9 | 238 | 29.5 | 1300 | 6.04 | 11.2 | 135 | >95 |
| | | " | 2.0 | 390 | 5.6 | 1300 | 6.04 | 9.4 | 132 | — |
| | | " | 2.2 | 226 | 30.5 | 1300 | 6.02 | 8.5 | 119 | — |
| | | 0.5 | 1.7 | 230 | 28.5 | 1300 | 6.03 | 13.2 | 125 | >95 |
| | | " | 3.0 | 222 | 27.6 | 1300 | 6.03 | 7.5 | 115 | — |
| | Cu | 0.05 | 1.7 | 230 | 28.5 | 1200 | 5.96 | 14.7 | 140 | 90 |
| | | 0.1 | 1.7 | 230 | 28.5 | 1200 | 5.99 | 14.9 | 150 | 93 |
| | | " | 2.0 | 218 | 25.6 | 1200 | 6.01 | 9.6 | 126 | — |
| | | 0.3 | 1.3 | 231 | 28.8 | 1100 | 5.98 | 14.5 | 145 | 93 |
| | Cu | 0.3 | 1.7 | 230 | 28.5 | 1200 | 6.02 | 15.3 | 165 | >95 |
| | | " | " | 230 | 28.5 | 1300 | 6.05 | 15.6 | 170 | >95 |
| | | " | " | 380 | 6.4 | 1300 | 6.05 | 16.1 | 139 | >95 |
| | | " | 1.9 | 238 | 29.5 | 1300 | 6.06 | 10.9 | 135 | >95 |
| | | " | 2.2 | 226 | 30.5 | 1300 | 6.07 | 8.6 | 134 | — |
| | | 0.5 | 1.7 | 230 | 28.5 | 1200 | 6.05 | 13.6 | 140 | >95 |
| | | " | 3.0 | 222 | 27.6 | 1300 | 6.05 | 7.8 | 120 | — |
| | Fe | 0.3 | 1.7 | 230 | 28.5 | 1200 | 5.88 | 15.0 | 140 | >95 |
| | | " | 2.2 | 226 | 30.5 | 1300 | 6.01 | 8.6 | 124 | — |
| | Co | 0.3 | 1.7 | 230 | 28.5 | 1200 | 5.91 | 14.8 | 145 | >95 |
| | | " | 2.2 | 226 | 30.5 | 1300 | 6.02 | 8.5 | 128 | — |
| | Ni | 0.3 | 1.7 | 230 | 28.6 | 1200 | 6.03 | 15.3 | 168 | >95 |
| | | " | 2.2 | 226 | 30.5 | 1300 | 6.07 | 8.7 | 131 | — |
| | Zn | 0.3 | 1.7 | 230 | 28.5 | 1200 | 6.01 | 15.5 | 160 | >95 |
| | | " | 2.2 | 226 | 30.5 | 1300 | 6.07 | 8.5 | 133 | — |
| Reference | — | — | 1.7 | 230 | 28.5 | 1200 | 5.48 | — | 48 | 45 |
| | | " | 1.9 | 2.38 | 29.5 | 1300 | 5.53 | — | 55 | 52 |
| | | " | 2.0 | 218 | 25.6 | 1200 | 5.48 | — | 40 | — |
| | | " | " | 380 | 5.6 | 1300 | 5.66 | — | 23 | — |
| | | " | " | 585 | 1.3 | 1300 | 4.88 | — | 58 | — |
| | | " | 2.2 | 226 | 30.5 | 1300 | 5.70 | — | 58 | — |
| | | " | 3.0 | 222 | 27.6 | 1300 | 5.68 | — | 63 | — |
| | Mn | 0.3 | 1.1 | 226 | 30.5 | 1100 | crack | — | — | 35 |
| | | " | 1.7 | 230 | 28.5 | 1500 | crack | — | — | 32 |
| | | " | " | 568 | 1.2 | 1300 | 5.65 | — | 65 | 55 |
| | | 1.5 | 2.2 | 226 | 30.5 | 1300 | 6.01 | 4.2 | 60 | — |
| | Cu | 0.3 | 1.1 | 226 | 30.5 | 1300 | crack | — | — | 30 |
| | | " | 1.7 | 230 | 28.5 | 1500 | crack | — | — | 40 |
| | | " | " | 568 | 1.2 | 1300 | 5.58 | — | 63 | 48 |
| | | 1.5 | 2.2 | 226 | 30.5 | 1300 | 6.01 | 4.2 | 60 | — |

(PPh = parts per hundred)

TABLE 4

| | | raw material powder | | | | | | | |
|---|---|---|---|---|---|---|---|---|---|
| | metal spec. | deposit atom. ratio PPH | $Y_2O_3$ content mol. % | crystal particl. size A | BET specific surface Area $m^2/g$ | firing temperature °C. | sintered density $g/cm^3$ | fracture tenacity $MN/m^{3/2}$ | bending strength $Kg/mm^2$ | tetragonal content % |
|---|---|---|---|---|---|---|---|---|---|---|
| S | Mn | 0.3 | 1.7 | 230 | 28.5 | 1200 | 5.98 | 14.8 | 155 | >95 |
| (2-2) | Cu | 0.3 | 1.7 | 230 | 28.5 | 1200 | 6.01 | 14.9 | 156 | >95 |
| | Fe | 0.3 | 1.7 | 230 | 28.5 | 1200 | 5.88 | 16.1 | 139 | 92 |
| | Co | 0.3 | 1.7 | 230 | 28.5 | 1200 | 5.88 | 15.8 | 140 | 94 |
| | Ni | 0.3 | 1.7 | 230 | 28.5 | 1200 | 5.99 | 14.5 | 149 | >95 |
| | Zn | 0.3 | 1.7 | 230 | 28.5 | 1200 | 5.92 | 14.8 | 148 | >95 |
| Reference | — | — | 1.7 | 230 | 28.5 | 1200 | 5.48 | — | 48 | 45 |

TABLE 4-continued

| | metal spec. | deposit atom. ratio PPH | raw material powder | | | firing temperature °C. | sintered density g/cm³ | fracture tenacity MN/m^{3/2} | bending strength Kg/mm² | tetragonal content % |
|---|---|---|---|---|---|---|---|---|---|---|
| | | | $Y_2O_3$ content mol. % | crystal particl. size A | BET specific surface Area m²/g | | | | | |
| S (2-3) | Mn | 0.3 | 1.7 | 230 | 28.5 | 1300 | 5.99 | 14.8 | 150 | 90 |
| | Cu | 0.3 | 1.7 | 230 | 28.5 | 1300 | 6.02 | 14.7 | 156 | >95 |
| | Fe | 0.3 | 1.7 | 230 | 28.5 | 1300 | 6.00 | 15.1 | 150 | 92 |
| | Co | 0.3 | 1.7 | 230 | 28.5 | 1300 | 5.98 | 14.7 | 140 | 90 |
| | Ni | 0.3 | 1.7 | 230 | 28.5 | 1300 | 6.02 | 13.9 | 155 | 89 |
| | Zn | 0.3 | 1.7 | 230 | 28.5 | 1300 | 6.00 | 14.1 | 145 | 86 |
| Reference | — | — | 1.7 | 230 | 28.5 | 1300 | 5.56 | — | 52 | 40 |

EXAMPLE 3

Alumina-Containing Partially Stabilized Zirconia Sintered Body and Method of Production (1) Preparation of raw material powder used for the production of the sintered body Sample (3-1)

The procedure of Example 1 to produce the powder principally containing zirconium compounds were repeated under the same condition as in Example 1, except for changing the amount of $YCl_3$, $MgCl_2$, $CaCl_2$ and $CeCl_3$, to be added, to prepare raw material powder containing the stabilizing agent.

A solution of the resultant zirconia powder containing the stabilizing agent, alumina powder and nitrates of each transition metal (other than Zr) compound in ethanol was put in a milling pot, and agitated and ground, then solvent was removed therefrom and dried to obtain the raw material powder used for the production of the sintered body.

Sample (3-2)

The procedure for Sample (3-1) used to prepare the material principally containing a zirconium compound was repeated under similar conditions except for the adding of alumina powder to the mixed solution of zirconium compounds and a stabilizer, to prepare zirconia powder containing alumina and the stabilizing agent.

The resultant zirconia powder containing alumina and the stabilizer and a solution of nitrate of each transition metal compound (other than Zr) in ethanol were put in the milling pot, agitated and ground, followed by removing solvent therefrom and drying to obtain raw material powder (3-2) used for the production of a sintered body. Sample (3-3)

The procedure for Sample (3-1) to prepare the material consisting essentially of zirconium compound was repeated under similar conditions except for the addition of $AlCl_3$ powder to the mixed solution of zirconium compound and stabilizing agents so as to form a homogeneous mixture, to prepare zirconia powder containing alumina and stabilizing agents.

The zirconia powder so obtained containing alumina and stabilizing agents and a solution of nitrate of each transition metal compound in ethanol was put in a milling pot, agitated and ground followed by removing solvent therefrom and drying to obtain the raw material powder (3-3) used for the production of a sintered body.

(2) Production of a Sintered Body

The raw material powder (3-1) to (3-3) were molded under conditions similar to that of Example 1 into a desired shape, then fired at a given temperature for 3 hours under atmosphere, to obtain alumina-containing partially stabilized zirconia body.

For reference, using the raw material powder prepared without the treatment by the transition metal compound, the same procedure was repeated under the same conditions to sinter to obtain the sintered body.

Then, a comparison was made with raw material (3-1) of sintered body produced under the same conditions, using the raw material with 1.0% of $Y_2O_3$ content.

(3) Characteristics of raw material powder and sintered body.

The same properties as those of Example 2 were measured about the raw material powder as prepared and the sintered body produced.

Further, Vickers hardness and bending strength after thermal treatment at 200° C. for 100 hours, of the resultant sintered body were measured.

Table 5 shows the properties of Sample (3-1) and the sintered body made therefrom.

The contents of the tetragonal phase in all of the sintered bodies except the reference samples were 95% or more.

It can be confirmed that grain size of $ZrO_2$ in the sintered body produced of all Samples except the reference samples in 2 μm or less, and the grain size of $Al_2O_3$ is 4 μm or less.

Table 6 shows the properties of sample (3-2) and the sintered body made therefrom.

The content of the tetragonal phase in all the sintered bodies except the reference samples was 95% or more.

It can be confirmed that the grain size of $ZrO_2$ in the sintered body produced of all samples except the reference samples is 2 μm or less, and the grain size of $Al_2O_3$ is 4 μm or less.

Table 7 shows the properties of Sample (3-3) and the sintered body made therefrom. The contents of the tetragonal phase in all the sintered bodies except the reference sample was 95% or more. The grain size of $ZrO_2$ in the sintered body produced of all samples except the reference sample is 2 μm or less and the grain size of $Al_2O_3$ is 4 μm or less.

TABLE 5

| zirconia powder containing stabilizers | | | alumina powder | | raw powder | | | sin- | fracture | | bending | |
|---|---|---|---|---|---|---|---|---|---|---|---|---|
| stabilizer | | | particl. | spec. | $Al_2O_3$ | | metal | firing | tered | tenacity | bending | strength | vickers |
| kind | cont. mol. % | particl. size μm | spec. surface m²/g | size μm | surface m²/g | conten. mol. % | tran. kind | COAT. PPH | temp. °C. | density g/cm³ | (KIc) MN/m^{3/2} | strength Kg/mm² | t. Kg/mm² | hardness kg/mm² |
| $Y_2O_3$ | 1.3 | 190 | 32 | 0.2 | 20 | 20 | Mn | 0.2 | 1300 | 5.58 | 14.0 | 132 | — | 1260 |

TABLE 5-continued

| zirconia powder containing stabilizers | | | alumina powder | | | raw powder | | firing temp. °C. | sin- tered density g/cm³ | fracture tenacity (KIc) MN/m^{3/2} | bending strength Kg/mm² | bending strength after t. Kg/mm² | vickers hardness kg/mm² |
|---|---|---|---|---|---|---|---|---|---|---|---|---|---|
| stabilizer kind | cont. mol. % | particl. size μm | spec. surface m²/g | particl. size μm | spec. surface m²/g | Al₂O₃ conten. mol. % | tran. metal kind | COAT. PPH | | | | | |
| | 1.7 | 230 | 28 | 0.5 | 7 | 10 | Mn | 0.1 | 1300 | 5.82 | 15.3 | 146 | 110 | 1250 |
| | " | " | " | 0.1 | 30 | 20 | Cu | 0.3 | 1400 | 5.57 | 18.5 | 150 | 105 | 1360 |
| | 2.0 | 320 | 10 | 0.1 | 30 | 59 | Mn | 0.2 | 1400 | 4.70 | 12.3 | 138 | — | 1600 |
| | " | 230 | 28 | 0.5 | 7 | 20 | Ni | 0.01 | 1300 | 5.32 | 10.5 | 131 | — | 1420 |
| | 2.5 | 230 | 28 | 0.1 | 30 | 1.0 | Cu | 0.2 | 1400 | 5.95 | 13.0 | 125 | — | 1150 |
| | " | " | " | 0.5 | 7 | 40 | Fe | 0.9 | 1400 | 5.10 | 8.3 | 135 | — | 1530 |
| | 3.5 | 150 | 35 | 0.3 | 10 | 20 | Zn | 0.3 | 1300 | 5.57 | 9.7 | 130 | — | 1260 |
| MgO | 8.1 | 230 | 28 | 0.5 | 7 | 10 | Cu | 0.3 | 1300 | 5.52 | 10.2 | 132 | 95 | 1230 |
| CaO | 8.0 | 230 | 28 | 0.5 | 7 | 10 | Co | 0.3 | 1400 | 5.45 | 7.2 | 125 | — | 1430 |
| CeO₂ | 8.0 | 200 | 29 | 0.5 | 7 | 20 | Mn | 0.3 | 1400 | 5.66 | 10.0 | 90 | 90 | 1200 |
| Y₂O₃ | 1.0 | 190 | 35 | 0.2 | 20 | 20 | Cu | 0.2 | 1300 | 5.07 | 4.8 | 53 | — | 920 |
| | 2.0 | 230 | 28 | 0.5 | 7 | 30 | — | — | 1300 | 4.74 | 4.2 | 65 | 47 | 810 |

(PPH - parts per hundred)

TABLE 6

| alumina Powder | | alumina contain. zirconia powder | | | | | raw powder | | firing temp. °C. | sintered density g/cm³ | fracture tenacity (Kic) MN/m^{3/2} | bending strength Kg/mm² | bending strength after t. Kg/mm² | vickers hardness Kg/mm² |
|---|---|---|---|---|---|---|---|---|---|---|---|---|---|---|
| crystal particle size μm | specific surface m²/g | zirconia component | | partic. size Å | Al₂O₃ cont. mol. % | spec. sur. m²/g | tran. metal kind | Coat. PPH | | | | | | |
| | | stabilizer kind | content mol. % | | | | | | | | | | | |
| 0.1 | 30 | Y₂O₃ | 1.3 | 250 | 40 | 30 | Mn | 0.9 | 1400 | 5.11 | 10.5 | 130 | — | 1530 |
| 0.3 | 10 | Y₂O₃ | 3.5 | 230 | 10 | 30 | Mn | 0.2 | 1200 | 5.82 | 12.5 | 130 | — | 1230 |
| 0.5 | 7 | Y₂O₃ | 1.7 | 250 | 20 | 30 | Cu | 0.3 | 1300 | 5.57 | 15.0 | 140 | 100 | 1350 |
| 0.5 | 7 | Y₂O₃ | 1.7 | 250 | 20 | 30 | Fe | 0.5 | 1300 | 5.56 | 9.0 | 135 | — | 1340 |
| 0.5 | 7 | Y₂O₃ | 1.7 | 250 | 20 | 30 | Ni | 0.3 | 1400 | 5.56 | 8.8 | 120 | — | 1330 |
| 0.5 | 7 | Y₂O₃ | 2.5 | 230 | 30 | 25 | Cu | 0.05 | 1400 | 5.33 | 11.3 | 133 | — | 1420 |
| 0.5 | 7 | MgO | 8.1 | 250 | 1.0 | 30 | Cu | 0.2 | 1400 | 5.76 | 10.0 | 100 | — | 1130 |
| 0.5 | 7 | CaO | 8.0 | 230 | 50 | 30 | Mn | 0.3 | 1400 | 4.74 | 8.5 | 105 | — | 1580 |
| 0.5 | 7 | Y₂O₃ | 1.7 | 230 | 20 | 30 | — | — | 1300 | 4.63 | 4.3 | 60 | 42 | 860 |

(PPH - parts per hundred)

TABLE 7

| alumina contain. zirconia powder | | | | raw powder | | firing temp. °C. | sintered density g/cm³ | fracture tenacity (Kic) MN/m^{3/2} | bending strength Kg/mm² | bending strength after t. Kg/mm² | vickers hardness Kg/mm² |
|---|---|---|---|---|---|---|---|---|---|---|---|
| zirconia component | | Al₂O₃ cont. mol. % | spec. surf. m²/g | tran. metal spec. | coat. PPH | | | | | | |
| stabilizer kind | cont. mol. % | | | | | | | | | | |
| Y₂O₃ | 1.3 | 3 | 30 | Ni | 0.2 | 1300 | 6.00 | 9.5 | 115 | — | 1150 |
| Y₂O₃ | 1.7 | 20 | 35 | Mn | 0.2 | 1300 | 5.57 | 13.5 | 135 | 110 | 1350 |
| Y₂O₃ | 2.5 | 40 | 30 | Cu | 0.2 | 1400 | 5.10 | 11.0 | 120 | — | 1530 |
| MgO | 8.1 | 10 | 35 | Mn | 0.2 | 1300 | 5.53 | 10.3 | 120 | — | 1250 |
| CaO | 8.0 | 30 | 35 | Cu | 0.2 | 1300 | 5.08 | 10.6 | 115 | — | 1420 |
| Y₂O₃ | 0.5 | 20 | 35 | Mn | 0.2 | 1300 | 4.66 | 4.5 | 70 | — | 750 |
| (Ref) | 2.0 | 30 | 35 | — | — | 1300 | 4.56 | 4.5 | 66 | — | 750 |

(PPH - parts per hundred)

Industrial Applicability

The invention describes a process for the preparation of a sinterable raw material powder used for the production of a zirconia sinterable body.

This process is explained in the foregoing examples describing a simple process wherein a transition metal compound other than Zr is deposited on the powder consisting essentially of a zirconium compound.

The transition metal compounds other than Zr are deposited uniformly on the surface of the powder particles consisting essentially of zirconium compounds so that the sinter activating effect can be obtained with even a small amount of coating, and, as described in the examples, the prepared raw material powder can be easily sintered. Accordingly, the process is useful for the preparation of raw material powder used to produce a partially stabilized zirconia sintered body or an alumina-containing partially stabilized zirconia sintered body.

Furthermore, the present invention contemplates a method for the production of a high density zirconia sintered body. This method is characterized by using the sinterable rawmaterial powder prepared in accordance with the aforementioned described process.

As set forth in the examples it is possible to sinter under atmospheric conditions without the use of any special equipment or operation, and the article produced has good mechanical properties.

In the examples given, only atmospheric firing to sinter was employed. Other techniques such as hot press technique and HIP method can also be used to produce a high density zirconia sintered body.

The present invention also contemplates a method of producing high density and very tough $Y_2O_3$ partially stabilized zirconia sintered body. This method is characterized by limiting the starting material to powder consisting essentially of zirconium compound.

In accordance with this method, the raw material powder can have a low temperature sintering ability in addition to being readily sinterable, whereas the grain growth during the sintering treatment of the sintered body is restricted so as to produce high density and very tough Y₂O₃ partially stabilized zirconia sintered body having microstructure and a high content of tetragonal phase.

Again, according to the present invention there is produced a Y₂O₃ stabilized zirconia sintered body having a novel composition. The sintered body is characterized by having Y₂O₃ content of more than 1.3 mol. % (parts per hundred) and less than 2.0 mol. % (parts per hundred) and further, the content of the tetragonal phase is more than 65%.

The sintered body can function as a structural member of high density and toughness.

Also, the present invention contemplates an alumina-containing partially stabilized zirconia sintered body having a novel composition.

The sintered body has high density and hardness imparted by the contained-alumina as set forth in the examples and also has great strength and excellent thermal stability.

Particularly, when the Y₂O₃ partially stabilized zirconia sintered body incorporates alumina, great toughness can be imparted as set forth in the foregoing examples. Therefore, the sintered body can be used as a structural member of high hardness and high thermal stability as a cutting material.

The present invention also provides a process for the preparation of sinterable raw material powder and a zirconia sintered body made therefrom that has high density, high strength, great toughness, great hardness and excellent thermal stability as well as an economical method for the production of the same. Therefore, the present invention has industrial significance.

It is to be observed, that the various reference texts and authorities have provided differing definitions of the term "transition element" and "transition metal" and, as is well understood by those skilled in the art, not all transition metals are either useful or available for the purpose of the present invention. As hereinbefore set forth, the following are the transition metals which are useful for the present invention: Mn, Fe, Co, Ni, Cu, Zn. These transition metals are used to coat the zirconium-based raw material powder by incorporating the foregoing transition metals in a solution or slurry as follows:

| SOLUTION | SLURRY |
|---|---|
| Nitrates, | Oxides |
| Chlorides, | Hydroxides |
| Oxalates | Carbonates |
| Acetates, | etc. |
| Propionates | |
| fatty acid salts, | |
| Alkoxides, | |
| Chelates, | |
| etc. | |

As a starting material coated with the foregoing transition metals, the examples show the use of a CaO containing zirconia powder; a MgO containing zirconia powder and, a Y₂O₃ containing zirconia powder.

Furthermore, the present invention contemplates the use, advantageously, of a precursor powder co-precipitated from a solution or slurry containing alpha-alumina powder or aluminum compounds which by their thermal decomposition can produce alumina, zirconium compounds and stabilizing agents. The zirconium compounds are ZrOCl₂ and ZrO₂. The stabilizing agents are CaO, MgO, CeO, and Y₂O₃ and the precursor thereof. Additionally, it is possible to use the following materials: Zr: hydroxide, carbonate, oxynitrate, oxysulfate, oxyacetate, alkoxide or the like and Al: oxide hydroxide, carbonate, chloride, nitrate, sulfate, acetate, alkoxide or the like.

What is claimed is:

1. In the production of a partially stabilized zirconia sintered body wherein the tetragonal phase content is sixty-five percent or more, the sintering temperature is 1100° C. to 1400° C. and the grain size is 0.5 μm or less, a process for the production of the sinterable raw material powder used for said production, said process comprising the steps of:

(a) suspending a powder of a zirconium compound containing a stabilizing agent into a solution or slurry containing a compound of a transition metal element other than zirconium, the atomic ratio of said other transition metal element to zirconium being in the range of from 0.0001 to 0.01, the zirconium compound being a compound of at least one material selected from the group consisting of oxide, hydroxide, carbonate, and organic acid salts, the stabilizing agent being at least one compound selected from the group consisting of oxide, hydroxide, carbonate and organic acid salts of at least one element selected from the group consisting of Y, Ca, Mg and Ce, in the range of from 1.3 to 2.0 mol parts as the oxide per hundred of the combination of zirconium compound as zirconia and the stabilizing agent as the oxide, and the other transition metal compound being at least one compound selected from the group consisting of oxide, hydroxide, nitrate, carbonate, chloride, organic acid salts, alkoxide and chelate of at least one transition metal selected from the group consisting of Mn, Fe, Co, Ni, Cu and Zn;

(b) removing the solvent from the slurry and drying the resultant powder to form a sinterable raw material powder coated with said transition metal compound.

2. A process as claimed in claim 1 wherein the zirconium compound containing a stabilizing agent is an oxide which is produced by calcining a hydroxide, carbonate, or organic acid salt co-precipitated from an aqueous solution of zirconium oxichloride and chloride of Y, Ca, Mg, or Ce.

3. A process as claimed in claim 1 wherein the zirconium compound containing a stabilizing agent is a hydroxide, carbonate or organic acid salt co-precipitated from an aqueous solution of zirconium oxichloride and chloride of Y, Ca, Mg or Ce.

4. A process as claimed in claim 1, wherein the amount of yttrium compound is between 1.3 mol part and 2.0 mol parts as Y₂O₃ based on the total amount of zirconium compound as ZrO₂ and yttrium compound as Y₂O₃.

5. In the production of an alumina containing partially stabilized zirconia sintered body, wherein the tetragonal phase content is sixty-five percent or more, the sintering temperature is 1100° C. to 1500° C. and the grain size of the partially stabilized zirconia is 2 μm or less and the grain size of the alumina is 4 μm or less, a process for the production of a sinterable raw material powder used for said production, said process comprising the steps of:

(a) suspending a powder of a zirconium compound containing a stabilizing agent and a powder of an aluminium compound into a solution or slurry containing a transition metal compound, wherein the transition metal element of said compound is a metal element other than zirconium, the atomic ratio of said other transition metal element to the combination of zirconium and aluminium being in the range of from 0.001 to 0.01, the zirconium compound being at least one compound selected from the group consisting of oxide, hydroxide, carbonate and organic acid salts, the stabilizing agent being at least one compound selected from the group consisting of oxide, hydroxide, carbonate and organic acid salts of at least one element selected from the group consisting of Y, Ca, Mg and Ce in the range of 1.3 to 2.0 mol parts as the oxide per hundred of the combination of zirconium compound as zirconia and the stabilizing agent as the oxide, the aluminium compound being at least on compound selected from the group consisting of oxide, hydroxide, carbonate and organic acid salts, the transition metal compound being at least one compound selected from the group consisting of oxide, hydroxide, nitrate, carbonate, chloride, organic acid salts, alkoxide and chelate of at least on transition metal selected from the group consisting of Mn, Fe, Co, Ni, Cu and Zn, and the powder of the aluminium compound being between 1 to 60 mol parts per hundred of the combination of the powder of aluminium compound and the powder of zirconium compound containing a stabilizing agent by oxide molar base calculation;

(b) removing the solvent from the slurry and drying the resultant powder to form said sinterable raw material powder coated with said transition metal compound.

6. A process as claimed in claim 5 wherein the zirconium compound containing a stabilizing agent is an oxide which is produced by calcining a hydroxide, carbonate or organic acid salt co-precipitated from an aqueous solution of zirconium oxichloride and chloride of Y, Ca, Mg or Ce.

7. A process as claimed in claim 5 wherein the zirconium compound containing a stabilizing agent is hydroxides, carbonates, or organic acid salts, co-precipitated from an aqueous solution of zirconium oxichloride and chloride of Y, Ca, Mg or Ce.

* * * * *